Sept. 27, 1938.  W. B. BARNES  2,131,263
OVERSPEED DRIVE CONTROL
Filed Jan. 8, 1934  2 Sheets-Sheet 1
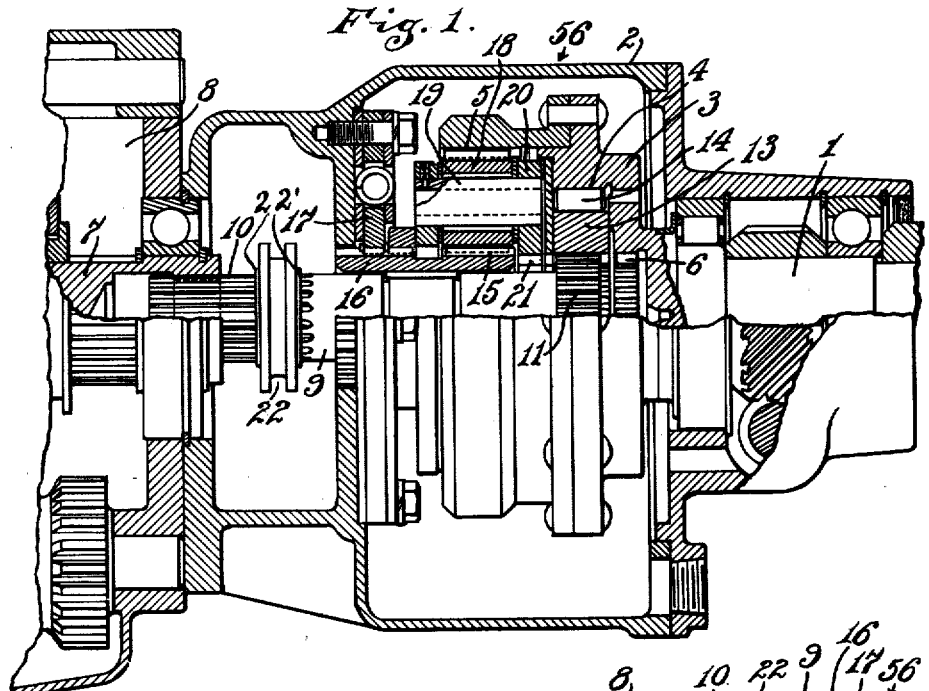
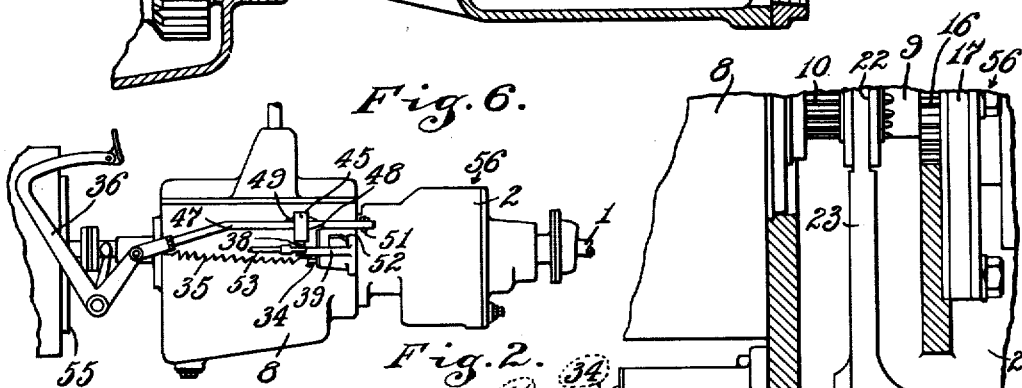
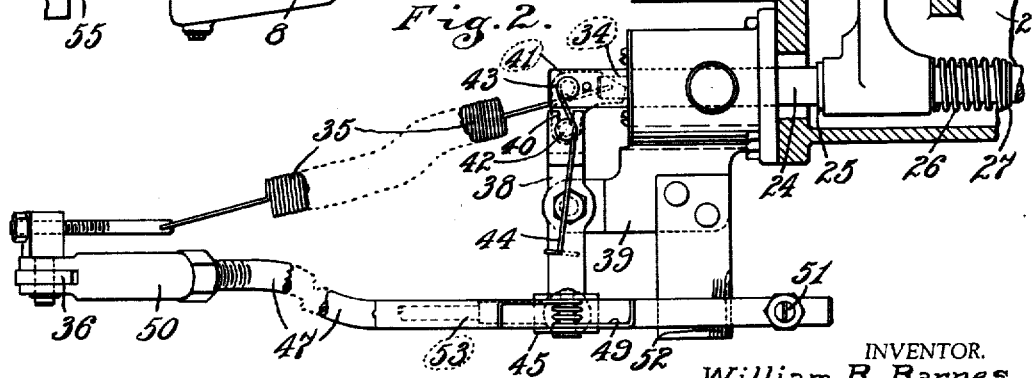
INVENTOR.
William B. Barnes,
BY
Hood + Hahn
ATTORNEYS Sept. 27, 1938.  W. B. BARNES  2,131,263
OVERSPEED DRIVE CONTROL
Filed Jan. 8, 1934   2 Sheets-Sheet 2
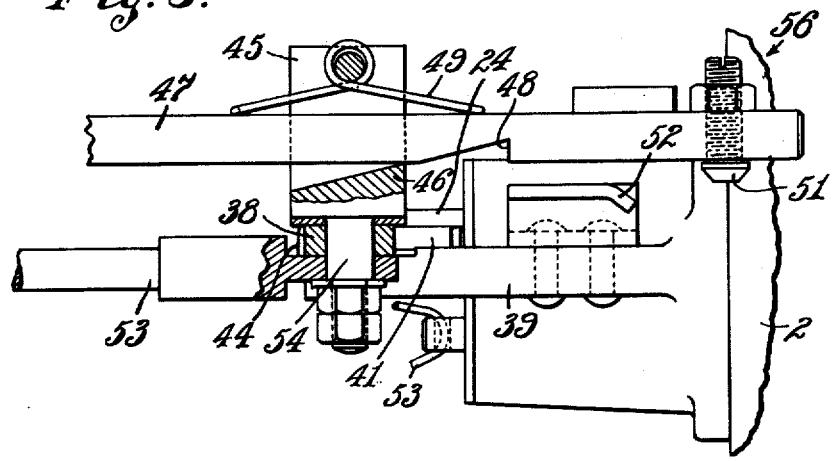
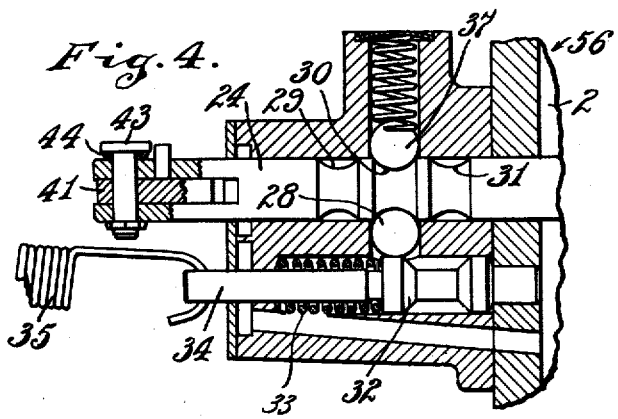
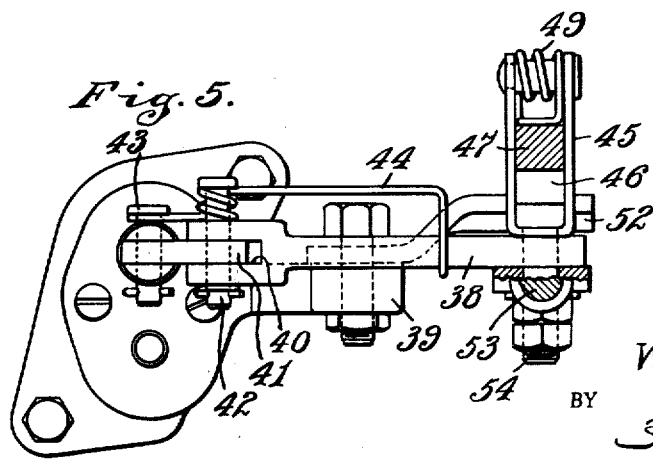
INVENTOR.
William B. Barnes,
BY
Hood + Hahn.
ATTORNEYS Patented Sept. 27, 1938

2,131,263

UNITED STATES PATENT OFFICE 2,131,263

OVERSPEED DRIVE CONTROL

William B. Barnes, Indianapolis, Ind.

Application January 8, 1934, Serial No. 705,787

9 Claims. (Cl. 192—3.6)

My invention relates to improvements in operating control mechanism for automobile transmissions and particularly to a type of transmission which is used as an overspeed drive. In the particular type of transmission for which my control is especially adaptable I provide a mechanism which may be used in conjunction with the regular automobile transmission and by which, in addition to the regular direct drive I may obtain an overspeed drive. In this particular form of mechanism I provide means whereby through the instrumentality of a planetary gear arrangement I am enabled to drive the propeller shaft at an overspeed, or I am enabled to provide a free wheeling mechanism between the propeller shaft and the transmission mechanism proper or I am enabled to provide for a direct drive.

In this type of transmission it is desirable and advantageous, when the apparatus is connected for overspeed drive to shift out of this overspeed drive before a shift is made in the standard transmission construction, thereby preventing "going into" second or low gear with the overspeed drive still connecting. Furthermore, it is desirable to shift out of this overspeed drive and into a free wheeling drive whenever a shift of the transmission into other than high takes place, as by shifting into the free wheeling drive, the shift between the gears of the standard transmission is facilitated.

Certain other advantages will appear more fully hereinafter.

For the purpose of disclosing my invention I have illustrated one embodiment thereof in the accompanying drawings in which Fig. 1 is a longitudinal sectional view of an overspeed drive transmission with which my control is particularly adaptable for use;

Fig. 2 is a plan view of the control mechanism;

Fig. 3 is a detail side elevation of the control mechanism, the parts being shown in intermediate or free wheeling position;

Fig. 4 is a detail section showing the means for locking the control mechanism in its various shifted positions;

Fig. 5 is a detail end elevation of a part of the control mechanism; and

Fig. 6 is a more or less diagrammatic view of the association of the parts.

In the transmission illustrated in Fig. 1, I have provided a structure wherein I can obtain an overspeed, free wheeling or direct drive. In this structure the propeller shaft 1 is provided within the casing 2 with an overhanging member 3 which constitutes one member 4 of an overrunning clutch and has secured thereon a ring gear 5 of a planetary gearing train. This member, in addition, is provided with internal clutch teeth 6, the purpose of which will more fully appear hereinafter.

Interposed between the propeller shaft 1 and the driving shaft 7 of the standard form of transmission 8 I provide an intermediate shaft 9 which at one end has a splined or toothed connection 10 with the driving shaft 7. At the opposite end this supplemental shaft 9, which has a certain amount of axial movement, is provided with clutch teeth 11 adapted for engagement with the clutch teeth 6 to establish a direct drive between the shaft 7 and the propeller shaft 1. These teeth 11 are also adapted to mesh with inner peripheral teeth on the inner member 13 of the overrunning clutch, this member being provided with cammed surfaces (not shown) and interposed between the inner member and the outer member are rollers 14. This construction provides for a one-way drive between the shaft 9 and the propeller shaft 1.

A sun gear 15 is formed on a sleeve 16 surrounding the shaft 9 and this sleeve is held against rotation through the instrumentality of a sound-deadening mechanism 17 connected to the casing 2. Interposed between the sun gear 15 and the ring gear 5 are a plurality of planetary pinions 18 mounted on pinion shafts 19 in turn carried by pinion carrier 20. This pinion carrier is provided with internal teeth 21 adapted, when the shaft 9 is moved axially to the left, looking at Fig. 1, to engage the teeth 11, whereby a planetary overspeed drive is established between the shaft 9 and the propeller shaft 1.

In operation when the shaft 9 is moved axially to the right to mesh the teeth 11 with the teeth 6 a direct drive is established between the shaft 7 and the shaft 1. To establish a one-way drive between the shaft 9 and the shaft 1 the shaft 9 is shifted axially to the left to disengage the teeth 11 from the teeth 6 but not far enough to engage the teeth 11 with the teeth 21. If it be desired to establish an overspeed drive the shaft 9 is shifted further to the left until the teeth 11 mesh with the teeth 21, thereby establishing an overspeed drive as above described.

The shaft 9 is provided with a collar having an annular groove 22 formed therein for the reception of a shifting fork 23 and being held in fixed axial position on the shaft 9 by the split rings 22'. This fork is mounted upon a shift rail 24 between a collar 25 and a coil spring 26, which spring is interposed between the hub of the fork 23 and a stationary collar 27 on the shift rail. This arrangement is such that the fork 23 will move with the shift rail 24 in both directions. At the same time a limited movement of the shift rail 24 in one direction is permitted to thus relieve the fork of shifting strains. In order to maintain the shift rail in any of its shifted positions I provide a locking ball 28 which is adapted to take into any of the annular grooves 29, 30 or 31 in the shift rail 24. With the ball in the groove 29 the shift rail 24 is locked in the direct drive position. With the ball in the groove 30 the shift rail is locked in the free wheeling position and with the ball in the groove 31 the shift rail is locked in the overspeed drive position. This ball 28 is moved into its locking position by means of a cammed shoulder 32 on a shiftable rod 34, which rod is connected by the resilient spring connection 35 with the engine clutch pedal 36 and biased in a locking direction by the coiled spring 33 surrounding the rod. It is apparent that when the clutch pedal is depressed the rod 34 through the instrumentality of the spring connection 35 will be moved to disengage the cam member 32 from the ball 28 to permit it to drop out of its locking position and, with the ball dropped out of its locking position, the shift rail 24 may be manually moved to any of its desired positions. After the shift rail has been moved to any of its desired positions the release of the engine clutch pedal, and thereby the engagement of the engine clutch, will again move the cam member 32 to force the ball 28 into its locking position. This structure, therefore, is such as to insure the disengagement of the clutch each time the above-described transmission mechanism is shifted.

A spring-pressed poppet ball 37 provides a positioning means for the shift rail 24.

When the overspeed drive is established it is desirable to insure that the overspeed transmission should be shifted out of overspeed drive, and preferably into free wheeling drive, before any shift takes place in the standard speed changing transmission and to insure the shift out of overspeed drive under such circumstances I provide means whereby the overspeed drive will be "kicked out" whenever the engine clutch is disengaged and during the initial disengaging movement of the engine clutch. To this end I provide a rocking lever or arm 38 mounted on a bracket 39 secured to the transmission frame and connected with the shift rail 24. This arm 38 is bifurcated at its outer end as at 40 and pivotally receives between its bifurcated arms a link 41 which is pivotally connected to the arm 38 through the instrumentality of the pin 42. The opposite end of this link 41 is pivotally connected, in a slot in the end of the shift rail 24, by means of a pin 43. A spring 44 wrapped around the pin 42 has one end engaging the pin 43 and its opposite end engaging the arm 38, whereby a semi-rigid connection is provided between the shift rail 24 and the arm 38 so that any movement of the arm is resiliently imparted to the rail 24. The opposite end of the arm 38 is provided with a U-shaped catch member 45 having in the bottom thereof a catch 46. An operating rod 47 slidably extends through this catch member and is provided with a notch forming a catch shoulder 48 adapted in certain positions of the rod to engage the catch 46. This rod 47 is biased into engaging position by a spring 49. The rod 47 is extended forward and through the medium of an adjustable connection 50 is connected with the engine clutch pedal 36 so that when the engine clutch pedal is depressed, during the initial depressing movement, the shoulder 48 will engage the shoulder 46 to rock the arm 38 in a direction to shift the shift fork 23 and with it the shaft 9 out of overspeed drive position and into free wheeling position. By the time this movement has been effected a projecting screw 51 on the rod 47 engages a cam 52 stationarily mounted on the transmission frame, thereby raising the rod 47 and disengaging the shoulder 48 from the catch 46. Due to this disengagement position, with the engine clutch pedal fully depressed, the rod 47 may be then manually shifted to any desired position. To this end I provide a manually-operated shift member 53 which is connected to the pin 54 extending through the arm 38, and this shift member 53 may be extended, by means of a link, or by means of a Bowden wire, to a position adjacent the driver, preferably on the dash of the vehicle. It is quite obvious that as soon as the clutch pedal is depressed the rod 34 will be shifted with the depression of the clutch pedal to release the locking ball 28 to permit any of the above-mentioned operations.

As shown in Fig. 6 the clutch throw-out pedal 36 is adapted to control the engine clutch 55 driving the propeller shaft 1 through the instrumentality of the transmission 8 and the overspeed transmission indicated at 56 heretofore described.

I claim as my invention:

1. In a transmission, the combination with a driving shaft adapted to be connected with a source of power by an engine clutch and a driven shaft, of a speed changing gearing for drivingly connecting said shafts, means operated by the disengagement of said engine clutch for drivingly disconnecting said gearing, and means for rendering said disconnecting means ineffective after said disconnection has been effected.

2. The combination with an overspeed gearing associated with speed changing gearing and an engine clutch, of means operated by the disengagement of the engine clutch for rendering said overspeed gearing drivingly inoperative, said means being unaffected by the reengagement of the clutch.

3. The combination with a transmission including an overspeed and direct drive associated with a speed changing gearing and an engine clutch, of means operated by the disengagement of the engine clutch for shifting said transmission out of said overspeed drive and into said direct drive, said means being unaffected by the reengagement of the clutch.

4. The combination with a transmission including an overspeed and direct drive associated with speed changing gearing and an engine clutch, of means operated by the disengagement of the engine clutch for shifting the transmission out of said overspeed drive and into said direct drive, said means being rendered ineffective after said shift has taken place to permit manual selective shifting of said transmission.

5. The combination with a transmission including an overspeed drive, a one-way direct drive and a two-way direct drive associated with an engine clutch, of means operated by the disengagement of the engine clutch for shifting said transmission out of said overspeed drive and into said one-way direct drive, said means being unaffected by the reengagement of the clutch.

6. The combination with a transmission including an overspeed drive, a one-way direct drive and a two-way direct drive associated with an engine clutch, of means operated by the disengagement of the engine clutch for shifting said transmission out of said overspeed drive and into a direct drive, said means being rendered ineffective after said shift has taken place to permit a manual selective shift of said transmission into any one of the other of said three drives.

7. The combination with a transmission including overspeed gear drive, a one-way drive and a two-way drive, shifting means for said transmission for selectively establishing any one of said drives, of a clutch pedal, means connecting said clutch pedal with said shifting means to drivingly disconnect said overspeed gear drive by the movement of the said clutch pedal, and means operated by a continued movement of said clutch pedal for rendering said connection ineffective, to thereby permit a manual operation of said shifting means while said clutch pedal is still depressed.

8. In a transmission, the combination with a driven shaft, of an axially shiftable driving shaft, a stationarily mounted sun gear, pinion gears interposed between said ring gear and said sun gear, a pinion gear carrier, clutch teeth on said pinion gear carrier, clutch teeth on said driving shaft movable into engagement with the clutch teeth on said carrier, an engine clutch pedal, and means operated by the depression of said pedal for axially moving said driving shaft to disengage the teeth thereon from the teeth on said carrier.

9. In a transmission, the combination with a driven shaft, of an axially shiftable driving shaft, a ring gear on said driven shaft, a stationarily mounted sun gear, pinion gears interposed between said ring gear and said sun gear, a pinion gear carrier, clutch teeth on said pinion gear carrier, clutch teeth on said driving shaft movable into engagement with the clutch teeth on said carrier, an engine clutch pedal, a shift rod for said driving shaft, means for connecting said shift rod with said clutch pedal upon initial movement of the pedal to operate said shift rod, and means for disconnecting said shifting rod from said pedal by further movement thereof to permit independent movement of the shift rod.

WILLIAM B. BARNES.

CERTIFICATE OF CORRECTION.

Patent No. 2,131,263. September 27, 1938.

WILLIAM B. BARNES.

It is hereby certified that error appears in the printed specification of the above numbered patent requiring correction as follows: Page 3, first column, line 21, claim 8, after "shaft," second occurrence, insert the words and comma a ring gear on said driven shaft,; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.

engagement of the engine clutch for shifting said transmission out of said overspeed drive and into a direct drive, said means being rendered ineffective after said shift has taken place to permit a manual selective shift of said transmission into any one of the other of said three drives.

7. The combination with a transmission including overspeed gear drive, a one-way drive and a two-way drive, shifting means for said transmission for selectively establishing any one of said drives, of a clutch pedal, means connecting said clutch pedal with said shifting means to drivingly disconnect said overspeed gear drive by the movement of the said clutch pedal, and means operated by a continued movement of said clutch pedal for rendering said connection ineffective, to thereby permit a manual operation of said shifting means while said clutch pedal is still depressed.

8. In a transmission, the combination with a driven shaft, of an axially shiftable driving shaft, a stationarily mounted sun gear, pinion gears interposed between said ring gear and said sun gear, a pinion gear carrier, clutch teeth on said pinion gear carrier, clutch teeth on said driving shaft movable into engagement with the clutch teeth on said carrier, an engine clutch pedal, and means operated by the depression of said pedal for axially moving said driving shaft to disengage the teeth thereon from the teeth on said carrier.

9. In a transmission, the combination with a driven shaft, of an axially shiftable driving shaft, a ring gear on said driven shaft, a stationarily mounted sun gear, pinion gears interposed between said ring gear and said sun gear, a pinion gear carrier, clutch teeth on said pinion gear carrier, clutch teeth on said driving shaft movable into engagement with the clutch teeth on said carrier, an engine clutch pedal, a shift rod for said driving shaft, means for connecting said shift rod with said clutch pedal upon initial movement of the pedal to operate said shift rod, and means for disconnecting said shifting rod from said pedal by further movement thereof to permit independent movement of the shift rod.

WILLIAM B. BARNES.

CERTIFICATE OF CORRECTION.

Patent No. 2,131,263.  September 27, 1938.

WILLIAM B. BARNES.

It is hereby certified that error appears in the printed specification of the above numbered patent requiring correction as follows: Page 3, first column, line 21, claim 8, after "shaft," second occurrence, insert the words and comma a ring gear on said driven shaft,; and that the said Letters Patent should be read with this correction therein that the same may conform to the record of the case in the Patent Office.

Signed and sealed this 25th day of October, A. D. 1938.

Henry Van Arsdale (Seal)  Acting Commissioner of Patents.